(No Model.)  3 Sheets—Sheet 2.
H. W. ARMSTRONG.
VALVE GEAR.
No. 431,735.  Patented July 8, 1890.
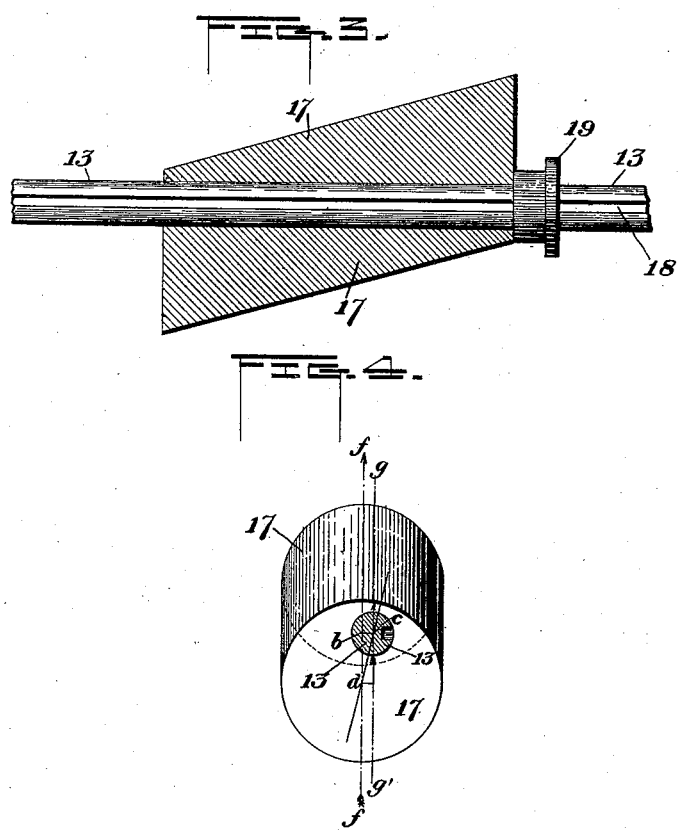

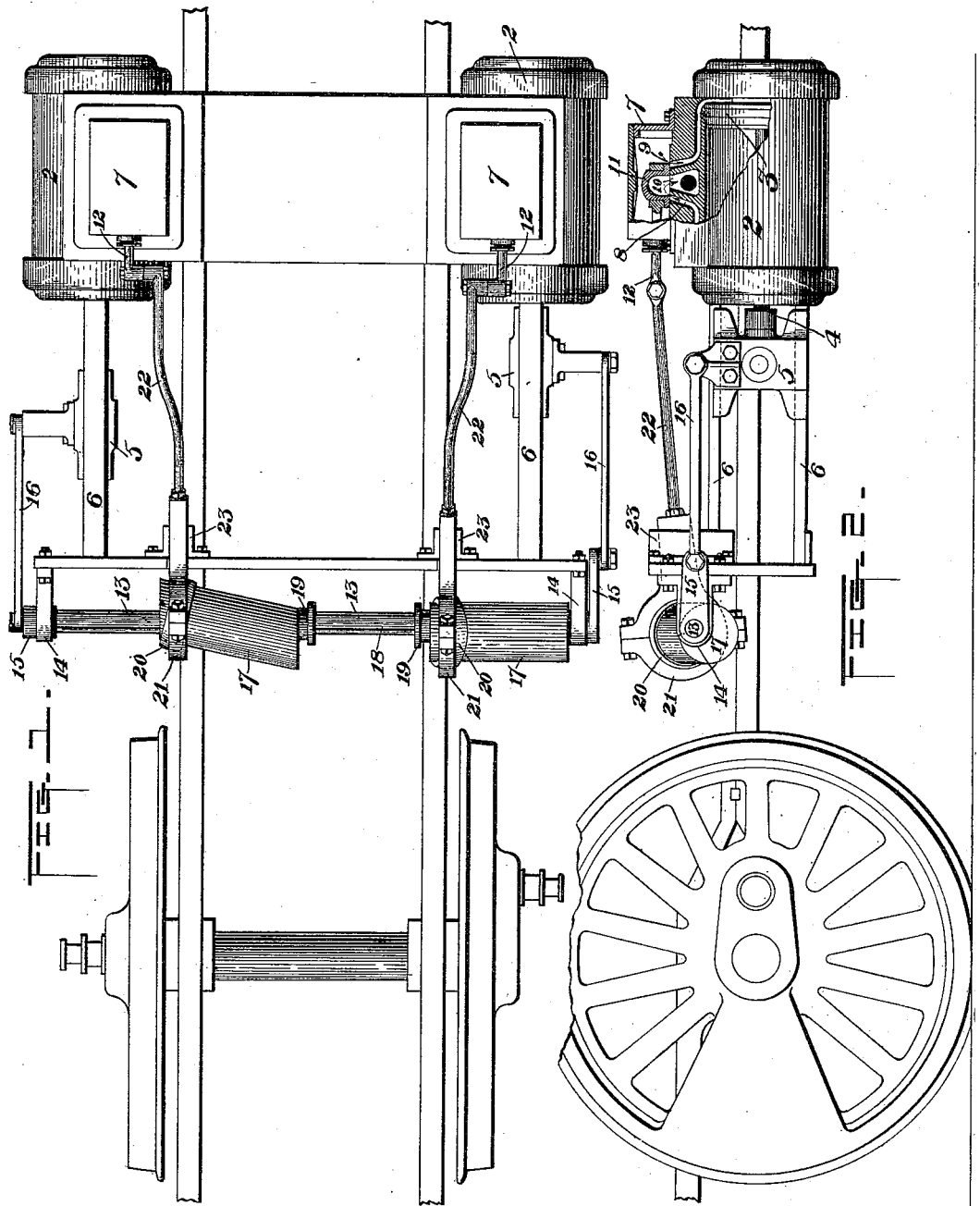

(No Model.)  3 Sheets—Sheet 3.
H. W. ARMSTRONG.
VALVE GEAR.
No. 431,735. Patented July 8, 1890.
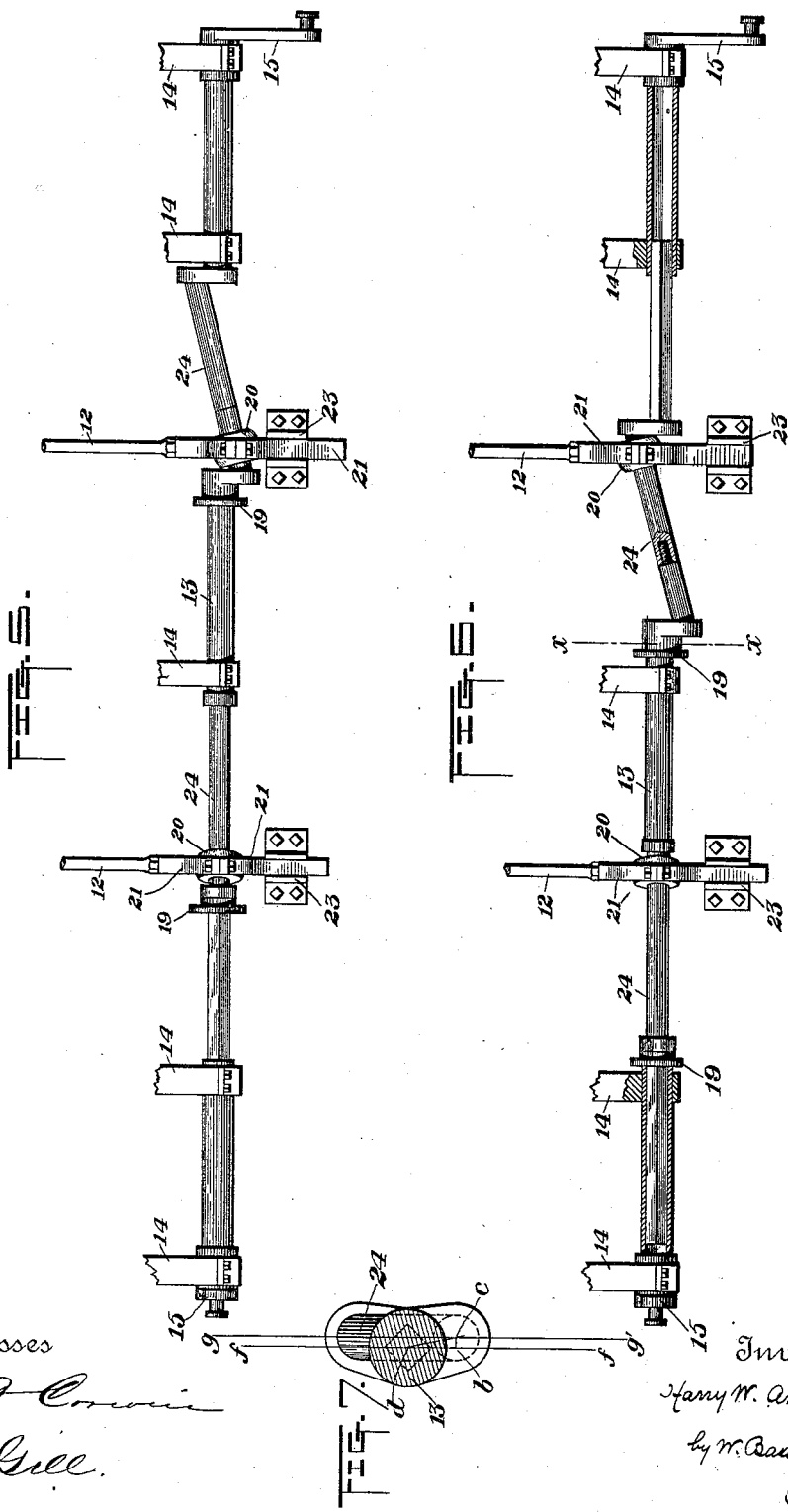
Witnesses
Inventor
Harry W. Armstrong
by W. Bakewell & Sons
Attorneys

UNITED STATES PATENT OFFICE.

HARRY W. ARMSTRONG, OF VERONA, PENNSYLVANIA.

VALVE-GEAR.

SPECIFICATION forming part of Letters Patent No. 431,735, dated July 8, 1890.

Application filed July 11, 1888. Serial No. 279,652. (No model.)

*To all whom it may concern:*

Be it known that I, HARRY W. ARMSTRONG, of Verona, in the county of Allegheny and State of Pennsylvania, have invented a new and useful Improvement in Locomotive Valve-Gear; and I do hereby declare the following to be a full, clear, and exact description thereof, reference being had to the accompanying drawings, forming part of this specification, in which—

Figure 1 is a plan view of the frame of a locomotive-engine, its steam-chest, and my improved valve-gear connected therewith. Fig. 2 is a side view thereof, the steam-chest being shown partly in vertical section for the purpose of more clearly illustrating the invention. Fig. 3 is a vertical axial section of the variable eccentric. Fig. 4 is an end view thereof. Fig. 5 is a plan view of a modification of my invention. Fig. 6 is a similar view showing the parts in a different position. Fig. 7 is a cross-section on the line $x\,x$ of Fig. 6.

Like symbols of reference indicate like parts in each.

In the drawings, 2 represents the cylinder of a steam-engine.

3 is the piston, 4 the piston-rod, and 5 the cross-head of the piston-rod, which moves in guides 6 in the usual way.

7 is the steam-chest, which communicates with the cylinder by means of the ports 8 and 9, and is provided with the usual exhaust-port 10.

11 is the slide-valve, which moves back and forth over the ports 8, 9, and 10, and is provided with a projecting valve-rod 12.

The construction of the parts is the same as that usually employed in locomotive steam-engines of the present day.

My invention relates only to the gear by means of which the slide-valve is operated, the object being to provide a substitute for the ordinary link-motion which shall possess all the advantages of the link-motion and shall be simpler and cheaper in construction, easier to adjust, and easier to operate.

The slide-valve is operated by the following mechanism, which constitutes the novel part of the devices shown in the drawings.

13 is a rotary shaft, which is journaled in suitable bearings 14, horizontally on the locomotive-frame, extending transversely of the locomotive. At each end it is provided with a crank-arm 15, and a connection-rod 16, attached to the crank-arm 15 at the one end and at the other end connected with the cross-head 5 of the piston. These cranks are suitably quartered on the shaft, and the reciprocations of the pistons by means of the connecting-rods and cranks impart a continuous rotation to the shaft. The shaft may be connected with and driven by other parts of the locomotive.

17 are cylinders or drums, which are cored out from end to end on lines inclined to their axial lines. The drums 17 are set on the shaft 13 so as to be capable of longitudinal motion thereon; but they are so connected with the shaft that they rotate with it. To this end I connect these parts by means of a keyway 18 and a corresponding key; or, instead thereof, the shaft may be squared and the bores of the drums correspondingly squared. At the ends of the drums 17 are collars 19, on which are yokes, which are loosely connected with the reversing-lever of the engine, as will be readily understood, and by this mechanism the drums may be moved longitudinally on the shaft, and may be set and held at any position thereon. Loosely mounted on the drums 17 are collars 20, the inside bores of which are cylindrical, to conform exactly to the external peripheries of the drums, while the external surfaces of the collars are curved in outline, so that each collar is in effect the zone of a sphere. Encircling the collars 20 are annular straps 21, each of which internally conforms to the external periphery of its inclosed collar. The straps 21 are connected by means of rods 22 with the valve-rods 12, and are guided and steadied in their motions by means of guide-boxes 23, through which they pass. The mechanism composed of these parts consists in effect of cams 17 of adjustable throw, the adjustment of the cams being effected by their longitudinal movement on the shaft 13. For example, when by means of the reversing-lever the eccentric drums 17 are moved in one direction, say to the right, so that the collars 20 and the encircling straps 21 shall be at the points where the axes of the drums approach most nearly to the axis of rotation—

*i. e.*, the axis of the shaft 13—then the rotation of the drums or cams with the shaft 13 will have no effect on the straps 21, and the connecting-links 22 will be practically motionless, because the centers of the straps are nearly coincident with the center of rotation of the drums. If, however, the drums be moved by the reversing-lever so as to remove their central points to a greater or less degree from the planes of the yokes 21, then their rotation acts on the yokes precisely as cams, whose throw is greater or less, corresponding to the distance of the yokes from the middle points of the drums. Thus, for example, if the reversing-lever be moved so as to move the drums sufficiently to bring the yokes 21 as nearly as possible to the ends of the drums, as shown in Fig. 1, the throw of the cams is the greatest, and the valve-rods 12 and the slide-valves are caused to reciprocate to the greatest extent. If, on the other hand, the drums 17 be moved in the other direction, so as to bring their other ends opposite to the yokes 21, the motions of the valve-rods and valves are the same in extent, but in opposite directions, and the motion of the engine is therefore reversed. As before stated, when the yokes are at the middle of the drums the valve-rods are practically not moved, and by setting the drums at intermediate points on either side of the center the degree of motion of the valves to secure either the forward or back motion of the engine may be nicely regulated. The whole mechanism is operated by means of the usual reversing-lever in the cab of the locomotive, the action being in this respect identical with the action of the reversing-lever in connection with the ordinary link-valve gear.

In Figs. 3 and 4 I illustrate the means by which the necessary lead is given to the slide-valve, both in the forward motion of the engine and during its reversal. In Patent No. 191,602 there is described a variable eccentric drum or cylinder, arranged so that its axis shall intersect the axis of the shaft on which it is set, the drum being connected with the shaft by a pin working in an inclined peripheral slot, so that on moving the drum to reverse the engine it shall be turned by the pin and slot a distance corresponding to the arc necessary to produce the lap and lead. The objection to this is that that rough usage to which the parts of the apparatus are subjected would soon wear them out and the device could never be relied on. As distinguished from this, my invention consists in so setting the variable eccentric or drum with relation to its axis of rotation that the proper position to secure the lap and lead is obtained directly by the motion of the cylinder to effect the reversal.

From the foregoing description it will be apparent that the variable eccentric which I employ performs the same function as that of the two eccentrics used in connection with the link-motion, one-half of the cylinder corresponding to one eccentric and the remainder corresponding to the other eccentric. In order, therefore, to secure the proper advance of both parts of the variable eccentric in the same manner that both eccentrics of the link-motion device have an angular advance corresponding to the lap and lead of the slide-valve, I set the eccentric as shown in Fig. 4, which shows the parts as they are when the piston of the engine has reached the end of its stroke. In this figure, $ff$ represent the axis of the eccentric projected, and $g\ g'$ represent the axis of rotation of the shaft 13. These lines do not intersect, but the axis of the eccentric is at all points distant by the line $c\ b$ from a vertical plane on the line $g\ g'$. As shown in Fig. 3, the axis of the cylinder is inclined to the axis of rotation, so that the eccentricity may be variable; but, as just explained, these axes do not intersect. Now, if the drum 17 be moved on the shaft sufficiently to bring the strap 21 from one side of the middle of the cylinder to the other, the strap is in effect transferred to a second eccentric, the center of which is at a different point from that of that portion of the cylinder on which it was before, and therefore the working of the engine will be reversed, but by reason of the fact that the distance between the axis of the cylinder and the vertical plane $g\ g'$ is constant, the lap and lead of the valve are preserved. The angle $b\ d\ c$ is the angle of advance of the valve, and its degree, which is determined in setting and connecting the parts of the gear, fixes the lap and lead of the valve. In accordance with these principles my invention may easily be applied to use by the skilled mechanic, its essential feature being that the axial line of the variable eccentric cylinder or drum and its axis of rotation shall not intersect, the distance between the axis of rotation and the plane of the axis of the eccentric determining the amount of lap and lead.

Within the scope of the invention as thus stated many modifications in form, arrangement, and details of construction will suggest themselves to those skilled in the art.

In the modification shown in the third sheet of the drawings, instead of moving the drum 17 upon the rotary shaft 13, I make the variable eccentric one of the parts of the shaft and movable with it. The shaft 13 in this case has bearings 14, which are in line with each other; but parts of the shaft are made at angles to the remainder, and, as before described with reference to the figures on the second sheet of the drawings, these inclined portions 24 of the shaft do not intersect the line formed by prolongation of the straight portions of the shaft which form its axis of rotation. The result of this peculiarity of arrangement is to produce the necessary lap and lead, as before described. The collars 20 are set on the inclined parts 24 of the shaft, and the yokes 21 encircle the collars, as before described. The shaft is in this case made movable lengthwise in its bearings and has collars 19, by which it is moved by means of the reversing-lever, and in order to provide for this motion I make the ends of the shaft hollow, as shown in Figs. 5 and 6, one part working telescopically within the other and made rotary therewith by being squared or otherwise keyed thereto. The operation is then as already described with reference to the figures on the first sheet of the drawings, there being an inclined portion 24 of the shaft at each side of the engine, one for each of the slide-valves. When the yoke 21 and collars 20 are at one end of the inclined part 24, the throw of the eccentric is greatest, to cause the engine to run in one direction, and when the shaft is moved to bring the collar to the other end of the inclined part 24 the throw is greatest in the opposite direction, and when the collar and yoke are at the middle there is practically no throw.

I claim—

1. As a reversing-gear for engines, the combination, with the valve, of a diagonally-placed elongated cylinder-eccentric, longitudinally movable relatively to its connection with the valve, the axis of the cylinder and its axis of rotation being so disposed that they shall not intersect, and the distance between the axis of rotation and the plane $g\ g'$ passing through the axis of the cylinder being proportionate to the lap and lead of the valve, substantially as and for the purposes described.

2. As a reversing-gear for engines, the combination, with the valve, of a rotary elongated cylinder set eccentrically relatively to its axis of rotation, and its axis of rotation being so disposed that they shall not intersect, an externally-spherical collar on said cylinder, and a yoke connecting the collar with the valve, said cylinder being longitudinally movable within the collar, substantially as and for the purposes described.

3. As a reversing-gear for engines, the combination, with the valve, of an elongated rotary eccentric connected therewith whose periphery is at different points of varying eccentricity with its axis of rotation, the axis of the eccentric and its axis of rotation being arranged so that they shall not intersect each other, and a rod connecting the eccentric with the cross-head of the piston and transmitting motion to the eccentric therefrom, substantially as and for the purposes described.

In testimony whereof I have hereunto set my hand this 7th day of July, A. D. 1888.

HARRY W. ARMSTRONG.

Witnesses:
W. B. CORWIN,
J. K. SMITH.